United States Patent
Grossmann et al.

(10) Patent No.: US 10,932,221 B2
(45) Date of Patent: Feb. 23, 2021

(54) USER EQUIPMENT LOCALIZATION IN A MOBILE COMMUNICATION NETWORK

(71) Applicant: FRAUNHOFER-GESELLSCHAFT ZUR FOERDERUNG DER ANGEWANDTEN FORSCHUNG E.V., Munich (DE)

(72) Inventors: Marcus Grossmann, Erlangen (DE); Markus Landmann, Erlangen (DE); Niels Hadaschik, Erlangen (DE)

(73) Assignee: FRAUNHOFER-GESELLSCHAFT ZUR FOERDERUNG DER ANGEWANDTEN FORSCHUNG E.V., Munich (DE)

(*) Notice: Subject to any disclaimer, the term of this patent is extended or adjusted under 35 U.S.C. 154(b) by 0 days.

(21) Appl. No.: 16/359,373

(22) Filed: Mar. 20, 2019

(65) Prior Publication Data

US 2019/0223140 A1 Jul. 18, 2019

Related U.S. Application Data

(63) Continuation of application No. PCT/EP2017/075599, filed on Oct. 9, 2017.

(30) Foreign Application Priority Data

Oct. 10, 2016 (EP) .................................. 16193154

(51) Int. Cl.
*H04W 64/00* (2009.01)
*G01S 5/02* (2010.01)
(Continued)

(52) U.S. Cl.
CPC .......... *H04W 64/003* (2013.01); *G01S 1/042* (2013.01); *G01S 1/0428* (2019.08); *G01S 1/20* (2013.01);
(Continued)

(58) Field of Classification Search
CPC ... H04W 64/003; H04W 4/029; H04W 48/10; H04L 5/0048; H04L 27/2628; H04L 47/34; G01S 1/20; G01S 5/0284; G01S 5/0257
See application file for complete search history.

(56) References Cited

U.S. PATENT DOCUMENTS

| | | | |
|---|---|---|---|
| 8,351,547 B2 | 1/2013 | Miyatani | |
| 8,401,111 B2 | 3/2013 | Sampath et al. | |

(Continued)

FOREIGN PATENT DOCUMENTS

| | | | |
|---|---|---|---|
| JP | 2001309424 A | 11/2001 | |
| JP | 2002171214 A | 6/2002 | |

(Continued)

OTHER PUBLICATIONS

3GPP, "Study on indoor positioning enhancements for UTRA and LTE", 3rd Generation Partnership Project, Dec. 2015.

(Continued)

*Primary Examiner* — Muthuswamy G Manoharan
(74) *Attorney, Agent, or Firm* — Perry + Currier

(57) ABSTRACT

A receiver, which is located in a spatial region of interest served by a transmitter of a wireless communication network, receives a radio signal from at least one transmitter of the wireless communication network, and the radio signal has a plurality of position reference signal (PRS) sequences. Each PRS sequence has associated therewith a different PRS sequence identifier, and each PRS sequence is send using a different beam cone of the transmitter. The beam cones of the transmitter for sending the plurality of PRS sequences are directed to the spatial region of interest. The receiver processes the radio signal to estimate a time of arrival of each PRS sequence and to obtain for each PRS sequence the associated PRS sequence identifier. A position of the (Continued)

receiver is estimated using the times of arrival and the obtained PRS sequence identifiers.

26 Claims, 8 Drawing Sheets

(51) Int. Cl.

| | | |
|---|---|---|
| *G01S 5/12* | (2006.01) | |
| *G01S 5/08* | (2006.01) | |
| *G01S 1/04* | (2006.01) | |
| *G01S 11/06* | (2006.01) | |
| *H04W 48/10* | (2009.01) | |
| *H04L 27/26* | (2006.01) | |
| *H04W 4/029* | (2018.01) | |
| *G01S 1/20* | (2006.01) | |
| *G01S 5/14* | (2006.01) | |
| *H04L 5/00* | (2006.01) | |
| *H04L 12/801* | (2013.01) | |

(52) U.S. Cl.
CPC .......... *G01S 5/0215* (2013.01); *G01S 5/0226* (2013.01); *G01S 5/0257* (2013.01); *G01S 5/0273* (2013.01); *G01S 5/0284* (2013.01); *G01S 5/08* (2013.01); *G01S 5/12* (2013.01); *G01S 5/14* (2013.01); *G01S 11/06* (2013.01); *H04L 5/0048* (2013.01); *H04L 27/2628* (2013.01); *H04L 47/34* (2013.01); *H04W 4/029* (2018.02); *H04W 48/10* (2013.01)

(56) References Cited

U.S. PATENT DOCUMENTS

| | | | |
|---|---|---|---|
| 2004/0072579 A1 | 4/2004 | Hottinen | |
| 2013/0028246 A1* | 1/2013 | Gonikberg | H04W 64/00 370/338 |
| 2014/0162704 A1 | 6/2014 | Choi et al. | |
| 2015/0011238 A1* | 1/2015 | Tujkovic | H04W 4/029 455/456.1 |
| 2015/0131750 A1* | 5/2015 | Xue | H04B 7/0482 375/267 |
| 2016/0203347 A1* | 7/2016 | Bartholomew | G06K 7/10158 340/539.23 |
| 2016/0295366 A1* | 10/2016 | Priyanto | H04B 7/0413 |
| 2017/0108579 A1* | 4/2017 | Irvine | G01S 5/08 |
| 2017/0366242 A1* | 12/2017 | Lee | H01Q 1/243 |

FOREIGN PATENT DOCUMENTS

| | | |
|---|---|---|
| JP | 2009188925 A | 8/2009 |
| JP | 2010041285 A | 2/2010 |
| JP | 2012509484 A | 4/2012 |
| JP | 2015184113 A | 10/2015 |
| KR | 20100109522 A | 10/2010 |
| KR | 20110124803 A | 11/2011 |
| WO | WO-2015145217 A1 | 10/2015 |

OTHER PUBLICATIONS

3GPP, "LTE Positioning Protocol a (LPPa) (Release 13)", 3rd Generation Partnership Project, Mar. 2016.

3GPP, "LTE Positioning Protocol (LPP) (Release 13)", 3rd Generation Partnership Project, Mar. 2016.

Fischer, Sven. "Observed time difference of arrival (OTDOA) positioning in 3GPP LTE." Qualcomm White Paper, 1.1 (2014): 1-62.

ISA/EP, International Search Report and Written Opinion, Jan. 17, 2018, re PCT International Patent Application No. PCT/EP2017/075599.

Thorpe, Mike, et al. "LTE location based services technology introduction." Rohde & Schwarz (2013).

Wylie-Green, Marilynn P., and S. S. Wang. "Robust range estimation in the presence of the non-line-of-sight error." IEEE 54th Vehicular Technology Conference, VTC Fall 2001, Proceedings (Cat No. 01CH37211), vol. 1, IEEE, 2001.

Venkatraman, Salpradeep, James Caffery, and H-R. You. "Location using LOS range estimation in NLOS environments." Vehicular Technology Conference. IEEE 55th Vehicular Technology Conference. VTC Spring 2002 (Cat. No. 02CH37367). vol. 2. IEEE, 2002.

Cong, Li, and Weihua Zhuang. "Non-line-of-sight error mitigation in TDOA mobile location." Globecom'01. IEEE Global Telecommunications Conference (Cat. No. 01CH37270). vol. 1. IEEE, 2001.

Chen, Pi-Chun. "A non-line-of-sight error mitigation algorithm in location estimation." WCNC. 1999 IEEE Wireless Communications and Networking Conference (Cat. No. 99TH6466). vol. 1. IEEE, 1999.

Xiong, Li. "A selective model to suppress NLOS signals in angle-of-arrival (AOA) location estimation." Ninth IEEE International Symposium on Personal, Indoor and Mobile Radio Communications (Cat. No. 98TH8361). vol. 1. IEEE, 1998.

Al-Jazzar, S., James Caffery Jr. and Heung-Ryeol You. "A scattering model based approach to NLOS mitigation in TOA location systems." IEEE Vehicular Technology Conference. vol. 2. 2002.

Chan, Yiu-Tong, et al. "Time-of-arrival based localization under NLOS conditions." IEEE Transactions on Vehicular Technology 55.1 (2006): 17-24.

Cong, Li, and Weihua Zhuang. "Nonline-of-sight error mitigation in mobile location." IEEE Transactions on Wireless Communications 4.2 (2005): 560-573.

Miao, Honglel, Kegen Yu, and Markku J. Junttl. "Positioning for NLOS propagation: Algorithm derivations and Cramer-Rao bounds." IEEE Transactions on Vehicular Technology 56.5 (2007): 2568-2580.

Papakonstantinou, Konstantinos, and Dirk Stock. "NLOS Mobile Terminal position and speed estimation." 2008 3rd International Symposium on Communications, Control and Signal Processing. IEEE, 2008.

Venkatraman, Salpradeep, James Caffery, and Heung-Ryeol You. "A novel ToA location algorithm using LOS range estimation for NLOS environments." IEEE Transactions on Vehicular Technology 53.5 (2004): 1515-1524.

* cited by examiner

USER EQUIPMENT LOCALIZATION IN A MOBILE COMMUNICATION NETWORK

CROSS-REFERENCE TO RELATED APPLICATIONS

This application is a continuation of copending International Application No. PCT/EP2017/075599, filed Oct. 9, 2017, which is incorporated herein by reference in its entirety, and additionally claims priority from European Application No. 16193154.8, filed Oct. 10, 2016, which is also incorporated herein by reference in its entirety.

The present invention concerns the field of wireless communication networks or systems, more specifically the localization of user equipment, like mobile terminals, in such a network.

BACKGROUND OF THE INVENTION

FIG. 1 is a schematic representation of an example of a network infrastructure, such as a wireless communication network or wireless communication system, including a plurality of base stations $eNB_1$ to $eNB_5$, each serving a specific area surrounding the base station schematically represented by the respective cells $100_1$ to $100_5$. The base stations are provided to serve users within a cell. A user may be a stationary device or a mobile device. Further, the wireless communication system may be accessed by IoT devices which connect to a base station or to a user. IoT devices may include physical devices, vehicles, buildings and other items having embedded therein electronics, software, sensors, actuators, or the like as well as network connectivity that enable these devices to collect and exchange data across an existing network infrastructure. FIG. 1 shows an exemplary view of only five cells, however, the wireless communication system may include more such cells. FIG. 1 shows two users UE1 and UE2, also referred to as user equipment (UE), that are in cell $100_2$ and that are served by base station $eNB_2$. Another user $UE_3$ is shown in cell $100_4$ which is served by base station $eNB_4$. The arrows $102_1$, $102_2$ and $102_3$ schematically represent uplink/downlink connections for transmitting data from a user $UE_1$, $UE_2$ and $UE_3$ to the base stations $eNB_2$, $eNB_4$ or for transmitting data from the base stations $eNB_2$, $eNB_4$ to the users $UE_1$, $UE_2$, $UE_3$. Further, FIG. 1 shows two IoT devices $104_1$ and $104_2$ in cell $100_4$, which may be stationary or mobile devices. The IoT device $104_1$ accesses the wireless communication system via the base station $eNB_4$ to receive and transmit data as schematically represented by arrow $106_1$. The IoT device $104_2$ accesses the wireless communication system via the user $UE_3$ as is schematically represented by arrow $106_2$.

The wireless communication system may be any single-tone or multicarrier system based on frequency-division multiplexing, like the orthogonal frequency-division multiplexing (OFDM) system, the orthogonal frequency-division multiple access (OFDMA) system defined by the LTE standard, or any other IFFT-based signal with or without CP, e.g. DFT-s-OFDM. Other waveforms, like non-orthogonal waveforms for multiple access, e.g. filter-bank multicarrier (FBMC), may be used.

In a wireless communication network, like the one depicted in FIG. 1, it may be desired to locate a UE with a certain accuracy in a cell. One approach to locate a UE within a cell is based on an observed time difference of arrival (OTDOA) estimation that may be used in cellular communication networks, such as LTE, and which is a downlink positioning method that relies on the calculation of time of arrival (TOA) estimates using position reference signals (PRS) receives at the user equipment UE from one or more surrounding base stations (eNB), as is described, for example, in references [2] and [3]. PRS sequences are downlink signals that are designed for positioning purposes and that are broadcast to all radio terminals within a cell. The PRS sequences are radiated with the same transmit power from the antenna of the base station or the remote radio head (RRH) in all directions to cover all users at any location of the cell, i.e., to provide a cell-wide coverage. To distinguish the PRS sequences from different cells, each PRS sequence has associated therewith a cell-specific identifier also referred to as a physical cell identifier (PCI). The PCI is unique in a specific area and is used to identify the cell and thus the PRS sequence. At least three timing measurements from geometrically dispersed base stations are needed, relative to the UE's internal time base, in order to obtain a unique position in a plane. Four base stations are needed to obtain a unique position in a three-dimensional space as is described in reference [4].

FIG. 2 is a schematic representation of a OTDOA measurement using three base stations, wherein the figure is based on an image taken from reference [4]. The base stations $eNB_1$ to $eNB_3$ send out respective PRS sequences having associated therewith a PCI. Base station $eNB_1$ sends out the PRS sequence $PRS_1$, base station $eNB_2$ sends out the PRS sequence $PRS_2$, and base station $eNB_3$ sends out the PRS sequence $PRS_3$. The base stations $eNB_1$ to $eNB_3$ serve different cells of the wireless communication network. Although FIG. 2 shows a transmission of the respective PRS sequences in only one direction from each base station, as explained above, each base station transmits the sequences in all directions to cover all users at any location within the respective cell. In the example of FIG. 2, a user equipment is assumed to be at location 108. The UE at location 108 receives from the respective base stations the PRS sequences PRS1 to PRS3. The UE at location 108 measures three TOAs $\tau_1$, $\tau_2$, $\tau_3$ relative to the UE internal time base. The base station $eNB_1$ is selected as a reference base station, and two OTDOAs are obtained by subtracting the TOA of the reference base station $eNB_1$ from the TOA measurements of the other base stations yielding as observed time differences of arrival the values $t_{2,1}=\tau_2-\tau_1$ and $t_{3,1}=\tau_3-\tau_1$, also referred to as relative signal timing differences (RSTDs). The relative signal timing differences are fed back to the base station serving the user equipment at location 108, as well as to a location server. The location server may be part of the base station or it may be an element separate from the base station, as is indicated at 110 in FIG. 1. The location server 110 may be part of the overall network structure and may be connected to each of the base stations shown in FIG. 1, although only one connection is shown in dotted lines in FIG. 1. The RSTD values are related to the geometric distances between the UE and the base stations and define hyperbolas around the respective locations of the base stations, as is indicated by line $\tau_3-\tau_1$ and line $\tau_2-\tau_1$ in FIG. 2. Based on the knowledge of the base station coordinates and the time offset between the UE and the reference base station $eNB_1$, the location server may determine the position of the UE. In FIG. 2, since each TOA measurement $\tau_i$ has a uncertain accuracy, the hyperbolas are shown with a width illustrating the measurement uncertainty. The estimated UE location is the intersection area of the two hyperbolas.

For the TOA measurements by the UE and the RSTD reporting, the first arriving signal path from each base station is to be accurately estimated. In pure line-of-side (LoS)

channel conditions, the TOA estimates reflect the first detected LoS peaks in a cross-correlation of the received signal with a PRS sequence, which is known at the UE, so that the TOA directly corresponds to the distances between the UE and the base station. This allows accurate position estimates for the UE. In multipath channel environments, however, the TOA estimates, and therefore also the RSTD measurements, may be biased by an obstruction of the LoS path or by the non-line-of-side (NLoS) signal path components of the channel and, in such a situation, the UE may not correctly detect the first arriving signal path which may lead to erroneous distance information.

The above described approach for localizing a UE within the cell uses PRS sequences that are transmitted by a plurality of base stations. Each base station sends out the same PRS sequence in all directions to cover all users. To allow for a localization at least three base stations are needed. Further, the radio propagation channel may suffer from a multipath propagation and shadowing or fading conditions so that the RSTD measurements may not be accurate. Multipath is a phenomenon that happens in the channel of mobile systems when the transmitted signal arrives at the receiver via different paths due to reflection, diffraction and scattering resulting in fading. This is schematically represented in FIG. 3 representing a UE within a cell i that is served by the base station BS transmitting the same PRS sequence with the associated cell identifier in all directions, namely the sequence $PRS_i$. The PRS sequence $PRS_i$ may not be directly received at the UE due to an obstacle $112_1$ scattering or shadowing the signal so that there is a path loss behind the obstacle $112_1$. The UE may receive the sequence $PRS_i$ due to a reflection of the signal at the obstacle $112_2$ and/or due to a diffraction at the obstacle $112_3$. In other words, there is only one transmitted signal $PRS_i$, however, the obstacles $112_1$ to $112_3$, like buildings, hills and trees, in the signal paths cause the signal to arrive at the UE from various directions with different delays. The multipath may be a source of error in the TOA estimation, for example, when there is no line of side path, even if the receiver UE detects the first arriving path.

To improve the position accuracy in multipath channel scenarios, a number of NLoS error mitigation techniques have been described for time-based location estimation, see for example references [6], [7], [8], [9], [10] and [11]. One NLoS error mitigation techniques may assume that the NLoS corrupted TOA measurements are only a small portion of the total number of measurements, i.e., some of the links between the UE and the base station contain an LoS channel path. Another approach may detect NLoS corrupted TOA measurements due to their inconsistency with the expected measurement for a LoS scenario so that NLoS links between the UE and the base station may be identified and ignored for the localizing of the UE position as is, for example, described in references [8] and [12]. Yet other approaches may use all links between the UE and the base station and may introduce a weighting or scaling of TOA measurements to minimize the NLoS contributions, as is described in reference [13], or detect the NLoS errors and use the information to calculate all possible UE locations, as is described in reference [14].

As is shown in FIG. 1, the base stations of the wireless communication network include a plurality of antennas ANT, for example formed by an antenna array including a plurality of antenna elements, and the UE may also include more than one antenna. In scenarios in which both the UE and the base station are equipped with a plurality of antennas, location-independent parameters may be exploited in addition to the OTDOA measurements of the LoS or NLoS path components, for example an angle of arrival (AoA) at the UE and an angle of departure (AoD) at the base station may be used. Instead of detecting only NLoS errors and removing the influence of these errors, examples of localization techniques may benefit from the NLoS channel propagation by exploiting the geometrical relationship of possible UE locations implied by the NLoS path components. Such techniques are described, for example, in references [15] and [16] and rely on a parametric description of the multipath channel propagation environment, assuming knowledge of the path-dependent parameters AoD, AoA and the path distance d.

FIG. 4 is a geometrical description of a single path component (single bounce reflection) for LoS and NLoS propagation of a PRS containing signal transmitted from the base station eNB towards a user equipment UE. FIG. 4 indicates the LoS path component, the NLoS path component, the angle of departure (AoD) of the signal at the base station, and the angle of arrival (AoD) at the UE. The parameters AoD, AoA and d may be estimated either at the UE and/or at the base station from the downlink/uplink reference signals. The AoA(s) of the path components are typically estimated at the base station by evaluating uplink sounding reference signals such as SRS sent by the UE. The AoA(s) may be estimated using the MUSIC algorithm or the SAGE algorithm. Assuming a system operating in a time-division-duplex (TDD) mode, and assuming that the forward and reverse channels are symmetric, the UE may estimate the AoA of each path component, which corresponds to the AoD of the reverse link by evaluating downlink sounding reference symbols, such as CSI-RS and/or PRS sent out by the base station. The distance d of each LoS/NLoS propagation path may be obtained from the respective TOA estimate at the UE. The TOA(s) and AoA(s) of a path component may be jointly estimated and the estimated AoA(s) and TOA(s) are fed back to the serving base station and/or to a location server, the latter using the estimated path parameters AoD, AoA and d together with a geometrical channel model description to perform the UE localization.

SUMMARY

An embodiment may have a receiver, wherein the receiver is located in a spatial region of interest served by a transmitter of a wireless communication network; wherein the receiver is configured to receive a radio signal from the transmitter of the wireless communication network, the radio signal comprising a plurality of position reference signal (PRS) sequences, each PRS sequence having associated therewith a different PRS sequence identifier, each PRS sequence send using a different beam cone of the transmitter, and the beam cones of the transmitter for sending the plurality of PRS sequences directed to the spatial region of interest; wherein the receiver is configured to process the radio signal to estimate a time of arrival of each PRS sequence received form the transmitter using the different beam cones and to obtain for each PRS sequence the associated PRS sequence identifier; and wherein a position of the receiver is estimated using the times of arrival and the obtained PRS sequence identifiers.

Another embodiment may have a transmitter, wherein the transmitter is configured to transmit a radio signal, the radio signal comprising a plurality of position reference signal sequences, wherein each PRS sequence has associated therewith a different PRS sequence identifier; wherein the transmitter is configured to send each PRS sequence using a different beam cone; and wherein the transmitter is configured to direct the beam cones for sending the plurality of PRS sequences to a spatial region of interest of a wireless communication network.

According to another embodiment, a wireless communication network may have: an inventive receiver; and one or more transmitters, wherein the transmitter is configured to transmit a radio signal, the radio signal comprising a plurality of position reference signal sequences, wherein each PRS sequence has associated therewith a different PRS sequence identifier; wherein the transmitter is configured to send each PRS sequence using a different beam cone; and wherein the transmitter is configured to direct the beam cones for sending the plurality of PRS sequences to a spatial region of interest of a wireless communication network.

According to another embodiment, a method may have the steps of: receiving, at a receiver located in a spatial region of interest served by a transmitter of a wireless communication network, a radio signal from the transmitter of the wireless communication network, the radio signal comprising a plurality of position reference signal sequences, each PRS sequence having associated therewith a different PRS sequence identifier, each PRS sequence send using a different beam cone of the transmitter, and the beam cones of the transmitter for sending the plurality of PRS sequences directed to the spatial region of interest; estimating a time of arrival of each PRS sequence received form the transmitter using the different beam cones; obtaining for each PRS sequence the associated PRS sequence identifier; and estimating a position of the receiver using the times of arrival and the obtained PRS sequence identifiers.

According to another embodiment, a method may have the steps of: transmitting, by a transmitter of a wireless communication network, a radio signal, the radio signal comprising a plurality of position reference signal sequences, wherein each PRS sequence has associated therewith a different PRS sequence identifier; wherein transmitting the radio signal comprises sending each PRS sequence using a different beam cone, and directing the beam cones to a spatial region of interest of a wireless communication network.

According to another embodiment, a method may have the steps of: transmitting, by a transmitter of a wireless communication network, a radio signal, the radio signal comprising a plurality of position reference signal sequences, wherein each PRS sequence has associated therewith a different PRS sequence identifier, wherein transmitting the radio signal comprises sending each PRS sequence using a different beam cone, and directing the beam cones to a spatial region of interest of a wireless communication network; receiving, at a receiver located in the spatial region of interest served by the transmitter of the wireless communication network, the radio signal from at least one transmitter of the wireless communication network; estimating a time of arrival of each PRS sequence; obtaining for each PRS sequence the associated PRS sequence identifier; and estimating a position of the receiver using the times of arrival and the obtained PRS sequence identifiers.

Another embodiment may have a non-transitory digital storage medium having a computer program stored thereon to perform the inventive methods when said computer program is run by a computer.

BRIEF DESCRIPTION OF THE DRAWINGS

Embodiments of the present invention will be detailed subsequently referring to the appended drawings, in which.

DETAILED DESCRIPTION OF THE INVENTION

In the following, embodiments of the present invention are described in further detail with reference to the enclosed drawings in which elements having the same or similar function are referenced by the same reference signs.

Figure 5:
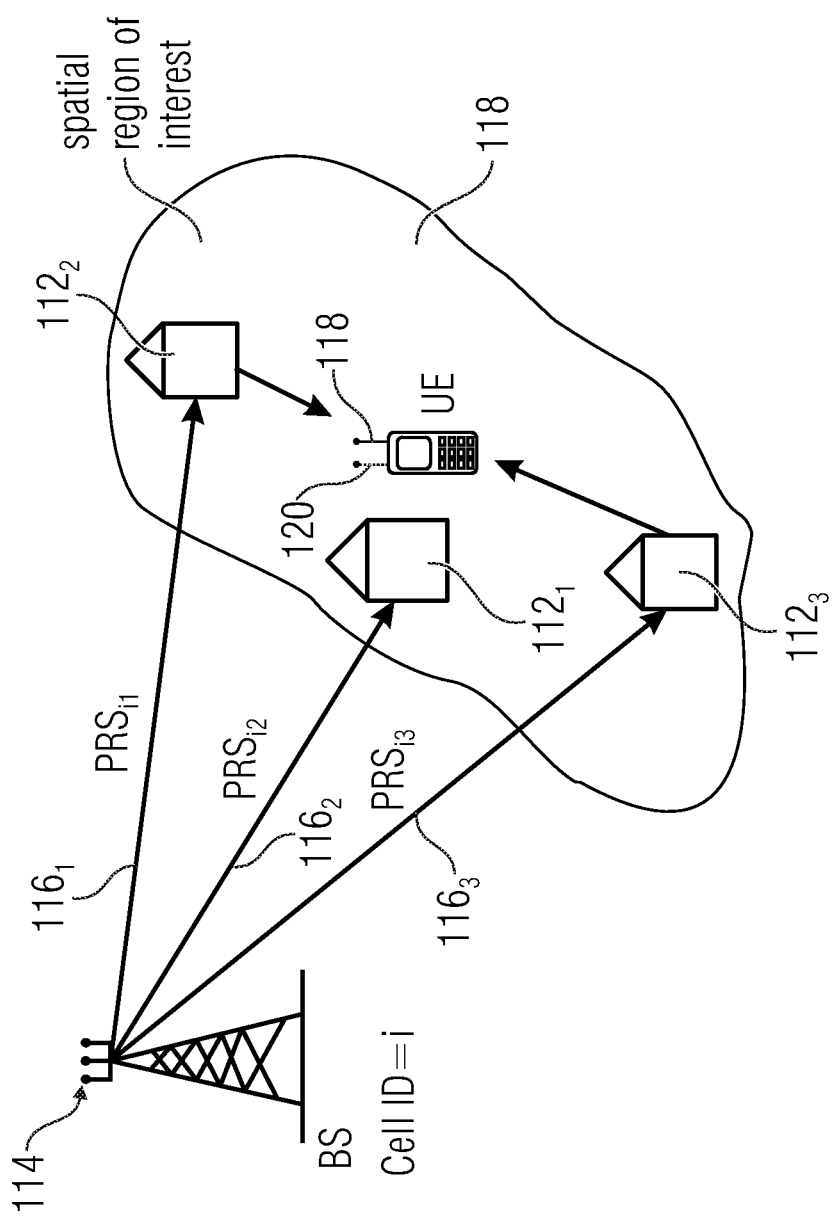
FIG. 5 shows an example of a cell of a wireless communication network operating, for localizing a user equipment UE, in accordance with the inventive approach described herein.

FIG. 5 shows an example of a cell of a wireless communication network operating, for localizing a user equipment UE, in accordance with the inventive approach described herein. The wireless communication network includes the cell i which is served by the base station BS. The base station BS includes a large-scale array antenna 114, also referred to as a massive array antenna. The array antenna may include a plurality of antenna elements. At least two antenna elements are provided to allow for beamforming of the signals to be transmitted by the antenna 114 to allow for a directional signal transmission of the signals. The number of antennas or antenna elements may be higher than 2, for example the array may include 32, 64 or more antenna elements. The base station BS forms a plurality of beam cones or lobes $116_1$ to $116_3$. Dependent on the number of antenna elements more or less beam cones may be formed. In accordance with examples, the base station BS uses a set of precoding matrices to form the beam cones $116_1$ to $116_3$, and the beam cones are formed such that the signal energy of each beam cone is concentrated in a main beam pointing direction. The main beam pointing direction is indicated in FIG. 5 by the arrows representing the beam cones $116_1$ to $116_3$. The array antenna 114 of the base station BS allows to direct the beam cones to a spatial region of interest 118 to transmit the downlink positioning reference signals into the spatial region 118. The spatial region 118 may be a certain area of the cell I that is served by the base station BS. One or more UEs may be present in the spatial region 118.

Figure 3:
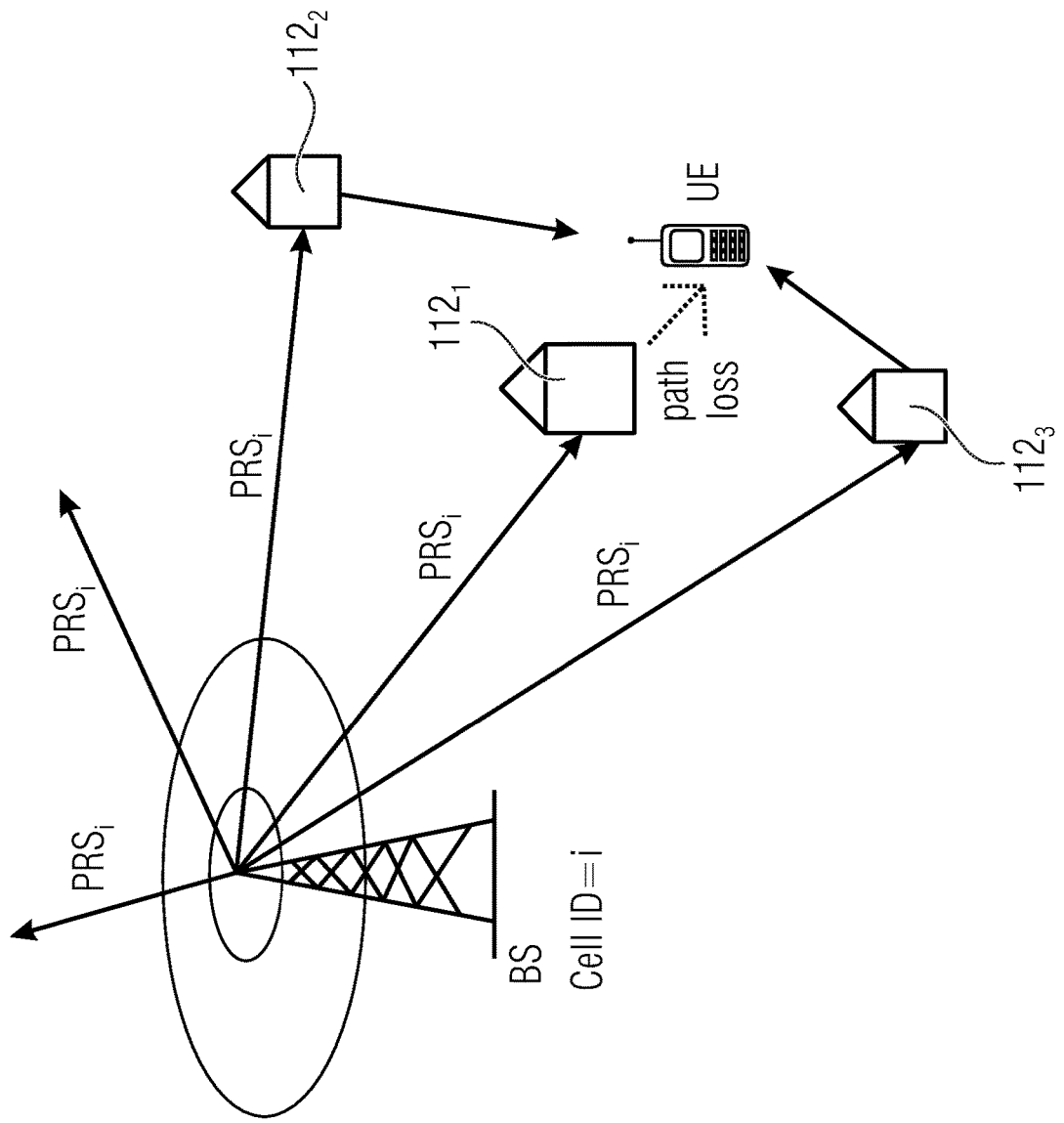
FIG. 3 represents a UE within a cell i that is served by a base station BS transmitting the same PRS sequence with the associated cell identifier in all directions.
Figure 4:
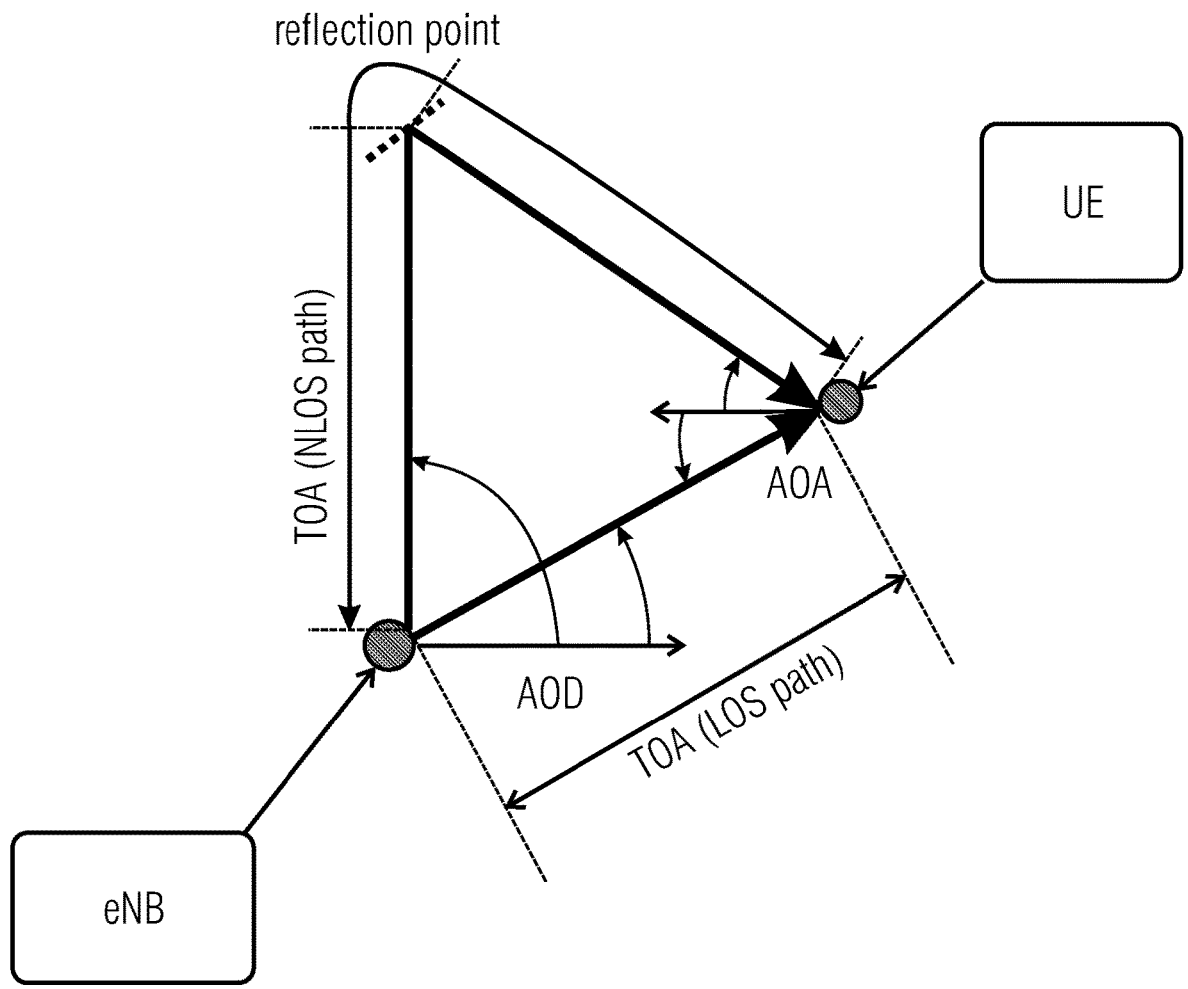
FIG. 4 is a geometrical description of a single path component (single bounce reflection) for LoS and NLoS propagation of a PRS containing signal transmitted from a base station towards a user equipment.

In accordance with examples, a precoding matrix in the set of precoding matrices, which is used by the base station BS, corresponds to exactly one beam cone that covers the spatial region of interest 118 in three dimensions, namely the azimuth and elevation dimensions. In addition to the beam cones shown in FIG. 5, the base station BS may send other beam cones to other spatial regions of interest in the cell i to localize UE in such regions. The base station BS performs a beamforming on multiple PRS sequences, and each PRS sequence is associated with an identifier, also referred to in the following as PRS sequence identifier, like a unique virtual cell identifier (VCID). Each of the beam cones has associated therewith one PRS sequence that differs from other PRS sequences associated with other beam cones. Further, in accordance with examples, also a physical cell ID may be associated with the respective PRS sequences. The sequence $PRS_{i1}$ is sent by the beam cone $116_1$, and different PRS sequences are generated for the different beam cones of the base station BS. The user equipment UE may include a single receive antenna, and, like in FIG. 3, the UE receives only reflected/diffracted signals, i.e., signals are received via the NLoS paths but no signal is received via the LoS path. The obstacle $112_1$ shades or scatters the beam cone $116_3$ so that the PRS sequence $PRS_{i2}$ is not received at the UE. On the other hand, the beam cones $116_1$ and $116_3$ are reflected or diffracted at the obstacles $112_2$ and $112_3$ so that the sequences $PRS_{i1}$, and $PRS_{i3}$ are received at the UE. The UE having the receive antenna 118 receives the signals $PRS_{i1}$, and $PRS_{i3}$ via the different beam cones $116_1$ and $116_3$ and performs the TOA/TDOA estimation of the multi-path components for each detected beam cone, more specifically for each PRS sequence carried by the respective beam cone. The PRS sequence having a certain identifier, like the VCID, is associated with a certain beam cone send out by the base station. The base station steers the beam cone in a certain direction to point to the spatial region of interest. On the basis of the VCID, which is obtained at the UE, the angle of departure (AoD) of the beam cone at the base station Is derived, either from the transmitted information of by accessing a database.

Due to the high signal energy concentration of the beam cone in the main beam pointing direction, each beam cone is associated either with a single specular path component or with a low number of specular path components of the radio channel so that the effective multipath channel associated with the beam cone contains a single strong path component or only few multi-path components so that the PRS cross-correlation function exhibits substantially only a single peak or only a few, resolvable peaks. Thus, only one TOA value or a few TOA values will be calculated for each detected beam cone.

The UE may derive from the beam cone the ID/VCID number of the PRS sequence. In accordance with one example, the estimated TOAs of the detected path components together with the associated ID/VCID number, i.e., the pairs of TOA/TDOA and ID/VCID number are returned to the base station BS serving the UE and/or to the location server 110 to perform the positioning algorithm.

Figure 6:
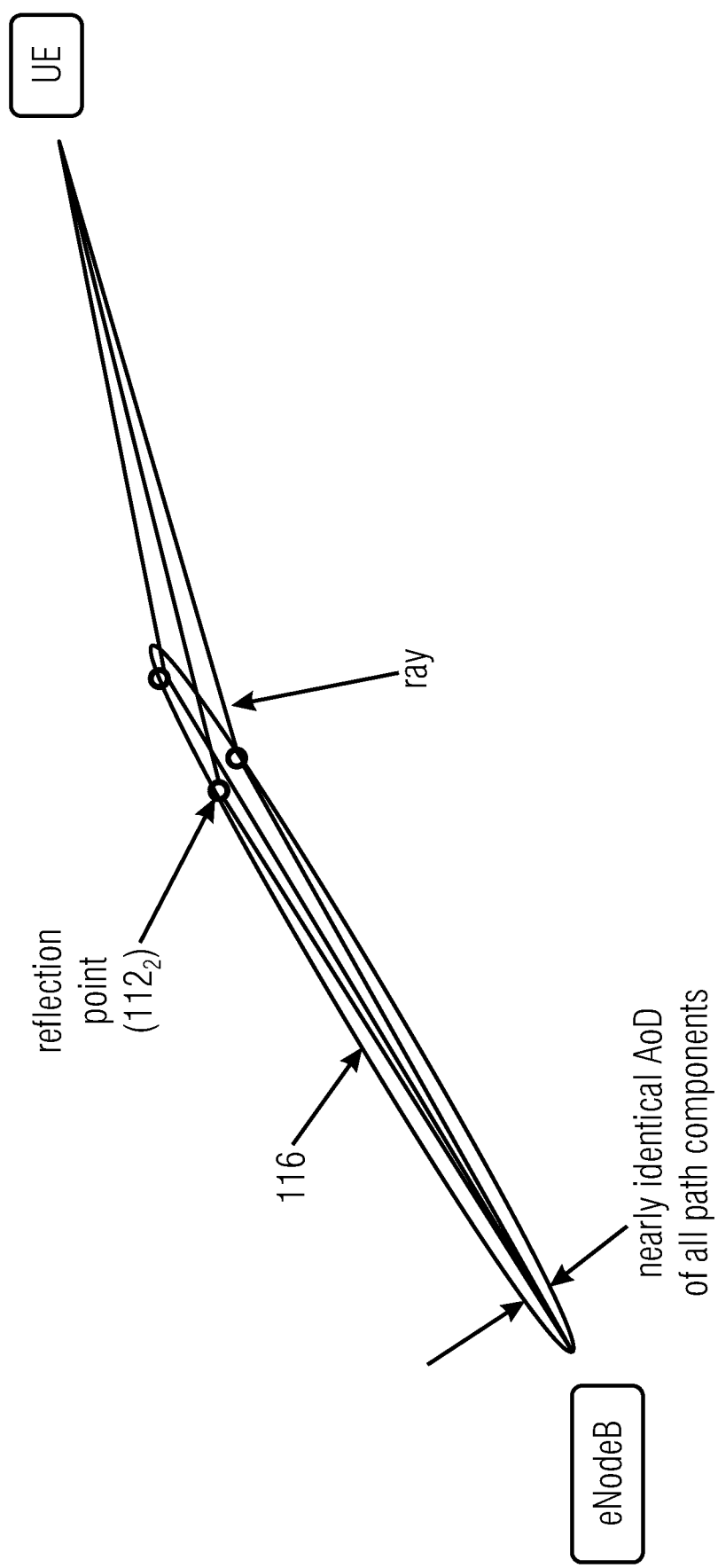
FIG. 6 shows an example of an AoD of all specular components associated with a beam cone to be identical to the beam pointing direction.

The positioning algorithm may apply a 3D parametric description of the radio channel to calculate possible regions of the UE position, and each specular (LoS/NLoS) path component in the 3D parametric description is characterized by the two path-dependent parameters TOA and AoD (azimuth elevation angles) at the base station, which are known at the base station and are associated with the respective beam cone on the basis of the beam cone VCID number. In accordance with examples, due to the high signal energy concentration of the beam cones and the main beam pointing direction, the AoDs of the specular path components are actually given by the beam pointing direction of the associated beam cone, as is schematically shown in FIG. 6 showing an example of the AoD of all specular components associated with a beam cone to be identical to the beam pointing direction. This allows the position algorithm to distinguish the individual path components no longer in time domain by using the TOA values but also in the space domain.

In accordance with other examples, the UE may decode from the signal transmitted by the base station the beam cone pointing direction information as well as the 2D or 3D coordinates of the base station BS. On the basis of this additional information and when the beam cone pointing direction and the base station coordinates are known at the UE side, the UE may perform the positioning algorithm itself. In this example it is not needed to feed back the information to the base station and/or the location server.

In accordance with other examples, the UE may be equipped with a plurality of antennas, more specifically a plurality of receive antennas, as is indicated schematically by the dotted antenna 120 in FIG. 5. In accordance with this example, the UE may include at least two receive antennas 118, 120. In accordance with other examples, more than two receive antennas may be provided. The UE may estimate, in addition to the TOA of each detected specular path component, the angle of arrival (AoA—azimuth and elevation) of the path component. The estimation of the TOA/TDOAs and AoA may be performed together or separately. The estimation may be performed at the location server or directly at the UE, provided that the UE has knowledge about the beam pointing direction and the base station coordinates. When the positioning algorithm is to be performed at the location server or the base station, the UE may report the estimated AoAs, the TOAs and the PRS sequence ID for each detected path component to the base station/location server. The positioning algorithm, independent on whether it is performed at the UE or at the location server, may apply a 3D geometrical description of the multipath channel propagation environment, and each detected path component may be described by the parameters AoA, TOA and AoD.

In accordance with the inventive approach as described above with reference to FIG. 5, a reliable and accurate estimation of the position of a UE may be achieved, even in situations in which no LoS path component is present, i.e., as depicted in FIG. 5, the location may be detected in a pure NLoS channel environment by taking advantage of the NLoS propagation. Since each beam cone is generated such that it has only a single path component or a very low number of path components, on the basis of the parameters AoA, TOA, AoD and the position of the base station, the positioning algorithm is able to calculate the position estimates in a pure NLoS channel environment.

In accordance with further examples, the UE may measure the received signal power or may apply other measurements to determine the reliability of each received beam cone. This measure may be returned to the serving base station or the location server. Together with the path/beam-dependent parameters, the positioning algorithm may distinguish between LoS propagation path components and NLoS propagation path components. For example by evaluating the respective receive beam cones with regard to a threshold a signal exceeding a minimum signal strength or signal power may be recognized as a LoS signal. The information about LoS and NLoS propagation path components as well as further information about the path gain/reliabilities of the beam cones may be used to improve the UE position estimate.

In accordance with yet other examples, the location information obtained by the location server or by the base station may be used to adjust the beamforming weights at the base station with respect to the UE position estimate. After the beamforming weights are adjusted, the UE may report back the now estimated TOA estimates which may be improved, and also the new AoA in case the UE has more than one antenna. This information is retuned together with the PRS sequence IDA/CID to the location server which then calculates the UE location estimate again. This process may be performed iteratively several times so that, sequentially, the position estimate is improved.

In accordance with other examples, in a TDD (time division duplex) mode, the beam cones at the serving base station BS may be steered dependent on a received signal power at the base station exceeding a predefined threshold. Initially, the base station may perform an AoA estimation of a specular path component during an uplink transmission from the UE. On the basis of this estimation, it is determined from which direction a signal is received, which has a power above the threshold. Following his, the respective beam cones are steered to have a beam pointing direction corresponding to the determined direction which allows for a further improvement of the location estimation.

In accordance with examples in which the UE is equipped with a plurality or with multiple antennas and performs an AoA estimation, the UE, together with the other path parameters, such as TOA and AoD, may calculate its own orientation. This calculation may also include data from additional sensors, like a gyroscope, provided in the UE.

In accordance with the examples described so far, the inventive approach allows for the location estimation of a UE using only a single base station. However, the estimation can be further improved and made more accurate when using more than one base station, for example when using one or more additional base stations from neighboring cells.

Figure 7:
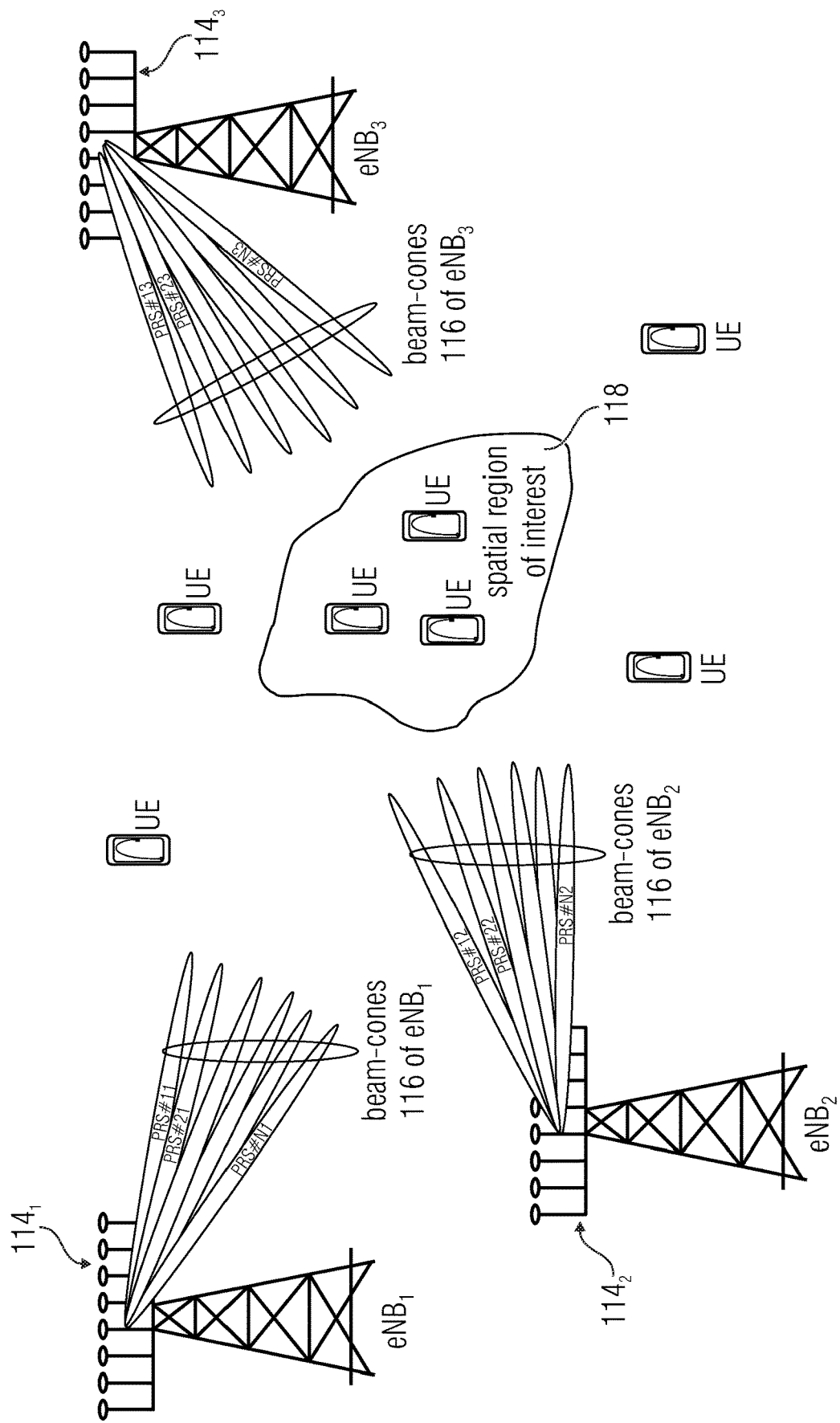
FIG. 7 shows a further example of the inventive approach allowing for a UE localization based on beamforming PRS sequences provided by a plurality of base stations.

FIG. 7 shows a further example of the inventive approach allowing for a UE localization based on beamforming PRS sequences provided by a plurality of base stations. Three base stations $eNB_1$ to $eNB_3$ are shown, and each base station sends out a plurality of beam cones 116 towards the spatial region of interest 118. Each of the base stations includes an array antenna $114_1$ to $114_3$ to form the beam cones. Each base station performs a beamforming of the PRS sequences to emits the PRS sequences. Each beam cone transmits a PRS sequence labelled $PRS_{\#ji}$, with i being the cell ID and j being the PRS sequence ID. For example, the sequence $PRS_{\#23}$ indicates the second beam cone of the base station $eNB_3$. The respective beam cones 116 are directed by appropriately steering the antenna arrays $114_1$ to $114_3$ the spatial region of interest 118. In the spatial region of interest 118 a UE may estimate the TOAs for the PRS sequences send by each of the base stations and perform the OTDOA estimation to allow for an estimation of the position of the UE.

In accordance with examples, each beam cone may also transmit system information, for example the pointing direction of the beam cone and the coordinates of the base station sending out the beam cone. On the basis of this additional information, the UE may perform the localization process by itself. Instead of receiving the additional system information via the beam cones 116, the UE may access a database, for example a database DB being part of the location server, to obtain therefrom for a beam cone the VCID, the beam cone pointing direction (e.g., azimuth and elevation), and the coordinates of the base station (e.g., 3D coordinates) sending out the beam cone in question.

In accordance with further examples, the wireless communication network may plan the use of the VCIDs over several base stations, to improve a spatial separation of the beam cones such that an induced interference between different neighboring beam cones is minimized. For example, the same VCIDs used by neighboring base stations may be assigned to beam cones which are not directed to the same spatial region of interest.

In accordance with the techniques described herein, the number of base stations needed for a position estimation of a UE may be significantly reduced. In accordance with examples, the number of base stations for a position estimation may be as low as a single base station.

The inventive teaching is advantageous in that the position estimation may be performed in multipath LoS/NLoS channel environments or in pure NLoS channel environments by exploiting a 3D geometric description of the channel model. Further, the positioning algorithm may distinguish between LoS and NLoS propagation path components by exploiting information about the path gain/reliability and the AoD of the detected beam cone/path components. Another advantage may be obtained when the UE has a plurality of receive antennas. Based on the beam cone pointing directions, for example in terms of the AoD (e.g., azimuth and elevation), available at the UE side, the estimated TOAs and the AoAs, the position algorithm exploiting a 3D geometrical channel description may be performed at the UE side.

Figure 1:
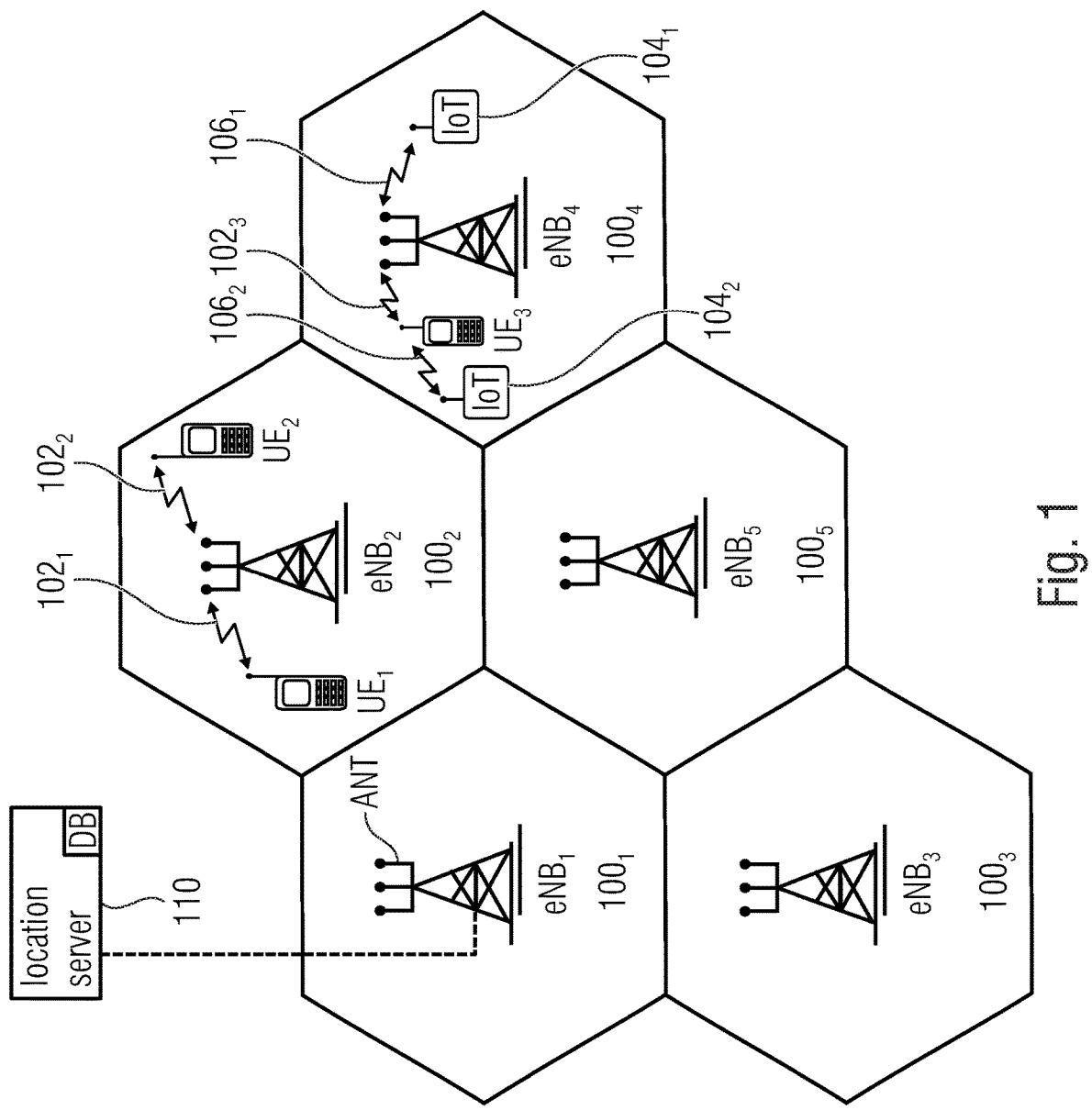
FIG. 1 shows a schematic representation of an example of a wireless communication system.
Figure 2:
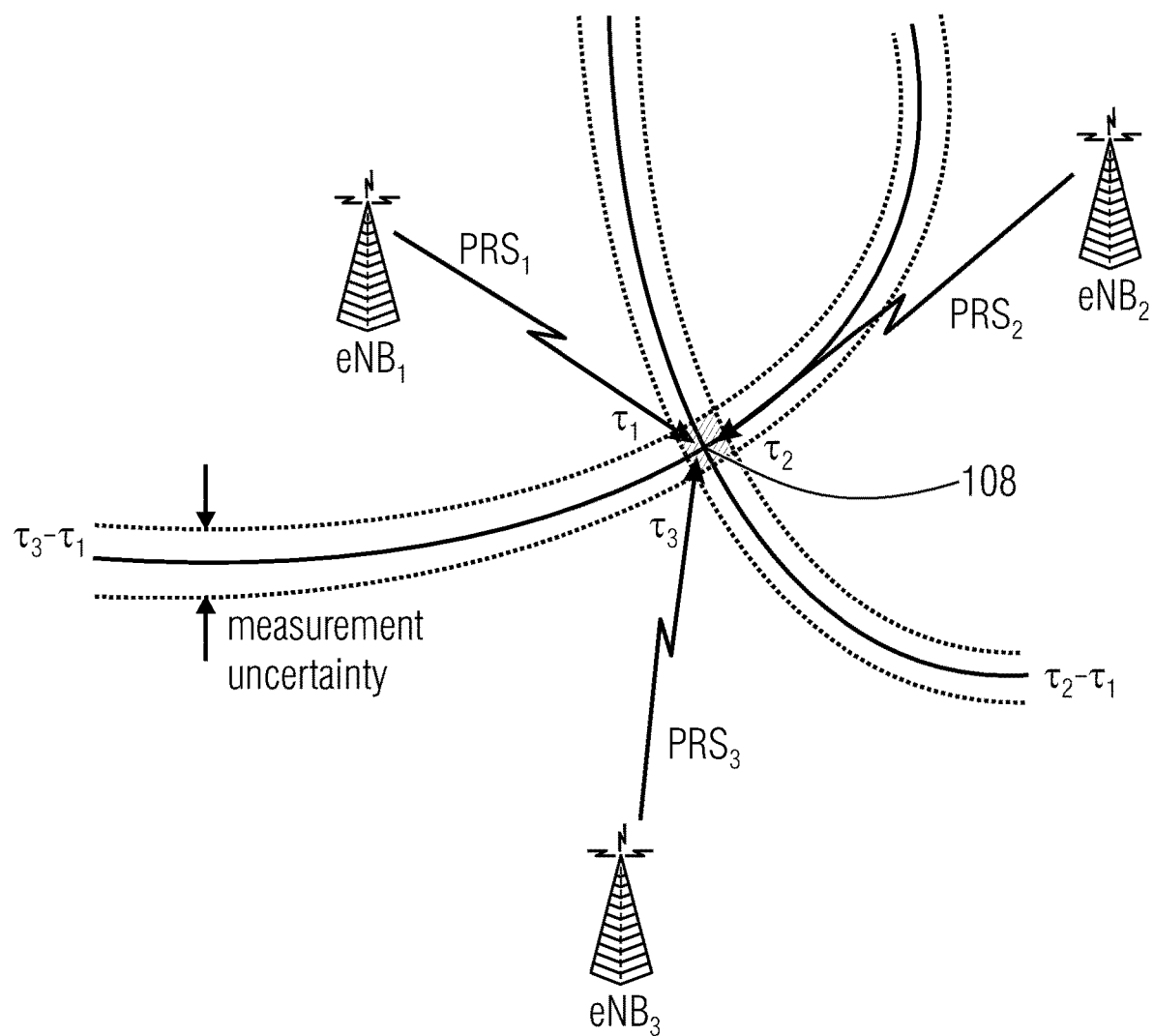
FIG. 2 is a schematic representation of a OTDOA measurement using three base stations.
Figure 8:
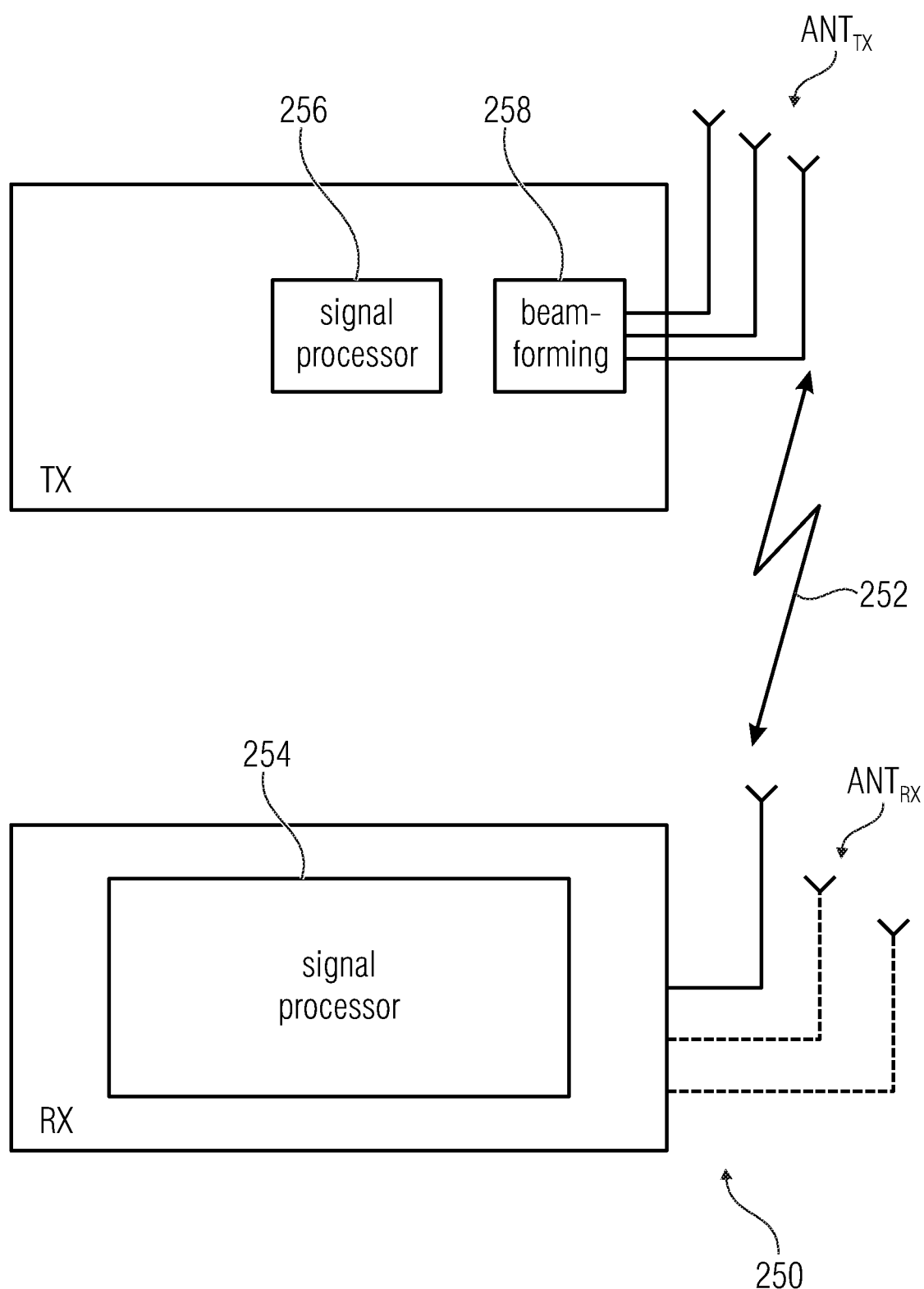
FIG. 8 is a schematic representation of a wireless communication system for transmitting information from a transmitter to a receiver.

Embodiments of the present invention may be implemented in a wireless communication system as depicted in FIG. 1 including base stations, users, like mobile terminals or IoT devices. FIG. 8 is a schematic representation of a wireless communication system 250 for communicating information between a transmitter TX and a receiver RX. The transmitter TX includes a plurality of antennas $ANT_{TX}$ or an antenna array having a plurality of antenna elements. The receiver RX includes at least one antenna $ANT_{RX}$. In other embodiments, the receiver RX may include more than one antenna. As is indicated by the arrow 252 signals are communicated between the transmitter TX and the receiver RX via a wireless communication link, like a radio link. The transmission may be in accordance with the one of the techniques described above with reference to FIG. 1

The signaling between the transmitter TX and RX is in accordance with the above described embodiments of the present invention so as to estimate a position of the receiver RX in a spatial region of interest within a cell of the wireless communication network. For example, the receiver RX receives via the antenna $ANT_{RX}$ the radio signal from the transmitter TX and applies the signal to a signal processor 254. The radio signal includes the plurality of position reference signal (PRS) sequences. Each PRS sequence has associated therewith a different PRS sequence identifier, and each PRS sequence is send using a different beam cone of the transmitter TX. The beam cones of the transmitter TX for sending the plurality of PRS sequences are directed to the spatial region of interest, e.g., by beamforming. The receiver RX processes the radio signal to estimate a time of arrival (TOA) of each PRS sequence and to obtain for each PRS sequence the associated PRS sequence identifier. A position of the receiver RX is estimated using the times of arrival and the obtained PRS sequence identifier. The position may be estimated at the receiver RX, at the transmitter or at a location server of the wireless communication network. In the latter cases, the TOAs and identifiers may be communicated to the transmitter/location server via the radio link 252.

The transmitter TX comprises a signal processor 256 and a beamformer 258 to generate a signal to be transmitted to the receiver RX. The transmitter TX may transmit a radio signal having a plurality of position reference signal (PRS) sequences. Each PRS sequence has associated therewith a different PRS sequence identifier. The transmitter TX sends each PRS sequence using a different beam cone. The transmitter TX directs the beam cones for sending the plurality of PRS sequences to the spatial region of interest of the wireless communication network.

Although some aspects of the described concept have been described in the context of an apparatus, it is clear that these aspects also represent a description of the corresponding method, where a block or a device corresponds to a method step or a feature of a method step. Analogously, aspects described in the context of a method step also represent a description of a corresponding block or item or feature of a corresponding apparatus.

Depending on certain implementation requirements, embodiments of the invention may be implemented in hardware or in software. The implementation may be performed using a digital storage medium, for example cloud storage, a floppy disk, a DVD, a Blue-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention may be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier. In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein. A further embodiment of the inventive method is, therefore, a data stream or a sequence of signals representing the computer program for performing one of the methods described herein. The data stream or the sequence of signals may for example be configured to be transferred via a data communication connection, for example via the Internet. A further embodiment comprises a processing means, for example a computer, or a programmable logic device, configured to or adapted to perform one of the methods described herein. A further embodiment comprises a computer having installed thereon the computer program for performing one of the methods described herein.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are performed by any hardware apparatus.

While this invention has been described in terms of several advantageous embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

REFERENCES

[1] 3GPP, "Study on indoor positioning enhancements for UTRA and LTE", 3rd Generation Partnership Project, December 2015

[2] 3GPP, "LTE Positioning Protocol (LPP) (Release 13)", 3rd Generation Partnership Project, March 2016

[3] 3GPP, "LTE Positioning Protocol A (LPPa) (Release 13)", 3rd Generation Partnership Project, March 2016

[4] S. Fischer, "Observed Time Difference Of Arrival (OT-DOA) positioning in 3GPP LTE", Qualcomm White Pap, vol. 1, pp. 1-62, June 2014

[5] M. Thorpe and E. Zelmer, "LTE Location Based Services Technology Introduction", Rhode & Schwarz, September 2015

[6] M. P. Wylie and S. Wang, "Robust range estimation in the presence of the non-line-of-sight error," in Proc. IEEE Vehicular Technology Conference, vol. 1, pp. 101-105, Fall 2001.

[7] S. Venkatraman, J. Caffery, and H.-R. You, "Location using LOS range estimation in NLOS environments," in Proc. IEEE Vehicular Technology Conference, vol. 2, pp. 856-860, Spring 2002.

[8] L. Xiong, "A selective model to suppress NLOS signals in angle-of-arrival AOA location estimation," in Proc. IEEE Int. Symp. Pers., Indoor, Mobile Radio Commun., Boston, Mass., Sep. 8-11, 1998, vol. 1, pp. 461-465.

[9] P. Chen, "A nonline-of-sight error mitigation algorithm in location estimation," in Proc. IEEE Wireless Commun. Netw. Conf., New Orleans, La., Sep. 21-24, 1999, vol. 1, pp. 316-320.

[10] L. Cong and W. Zhuang, "Non-line-of-sight error mitigation in TDOA mobile location," in Proc. IEEE Global Telecommun. Conf., San Antonio, Tex., Nov. 25-29, 2001, vol. 1, pp. 680-684.

[11] S. Al-Jazzar, J. Caffery, and H. You, "A scattering model based approach to NLOS mitigation in TOA location systems," in Proc. IEEE Veh. Technol. Conf., Birmingham, Ala., May 6-9, 2002, vol. 2, pp. 861-865.

[12] Y. Chan, W. Y Tsui, H. C. So, P. Ching, "Time-of-arrival based localization under NLOS conditions," IEEE Transactions on Vehicular Technology, January 2006, vol. 55, pp. 17-24.

[13] S. Venkatraman, J. J. Caffery, and H.-R. You, "A novel ToA location algorithm using los range estimation for NLOS environments," IEEE Trans. Veh. Technol., vol. 53, no. 5, pp. 1515-1524, 2004.

[14] L. Cong and W. Zhuang, "Nonline-of-sight error mitigation in mobile location," IEEE Trans. Wireless Commun., vol. 4, no. 2, pp. 560-573, March 2005.

[15] H. Miao, K. Yu, and M. J. Juntti, "Positioning for NLOS propagation: Algorithm derivations and Cramer-Rao bounds," IEEE Trans. Veh. Technol., vol. 56, no. 5, pp. 2568-2580, 2007.

[16] K. Papakonstantinou, D. Slock, "NLOS Mobile Terminal position and speed estimation," Communications, Control and Signal Processing, 2008. ISCCSP 2008. 3rd International Symp., pp. 1308-1313, March 2008.

The invention claimed is:

1. A receiver,
wherein the receiver is located in a spatial region of interest served by a transmitter of a wireless communication network;
wherein the receiver is configured to receive a radio signal from one transmitter of the wireless communication network, the radio signal comprising a plurality of position reference signal, PRS, sequences, each PRS sequence having associated therewith a different PRS sequence identifier, each PRS sequence send using a different beam cone of the one transmitter, and the beam cones of the one transmitter for sending the plurality of PRS sequences directed to the spatial region of interest;
wherein the receiver is configured to process the radio signal to estimate a time of arrival of each PRS sequence received from the one transmitter using the different beam cones and to acquire for each PRS sequence the associated PRS sequence identifier and an angle of departure at the one transmitter of a beam cone being associated with the PRS sequence identifier; and
wherein a position of the receiver is estimated using the times of arrival of the PRS sequences from the one transmitter at the receiver and the acquired angles of departure of the beam cones at the one transmitter; and
wherein the different beam cones are received at the receiver via non-line-of-sight, NLoS, paths.

2. The receiver of claim 1, wherein
the receiver is configured to receive a plurality of radio signals from a plurality of transmitters of different cells of the wireless communication network, each radio signal comprising the plurality of PRS sequences, each PRS sequence having associated therewith a cell identifier;
the receiver is configured to further acquire for each PRS sequence the associated cell identifier; and
a position of the receiver is further estimated using the acquired cell identifiers.

3. The receiver of claim 1, configured to send the estimated times of arrival and the acquired PRS sequence identifiers to a location server of the wireless communication network, and wherein the position of the receiver is estimated by the location server.

4. The receiver of claim 3, wherein the one transmitter is connected to the location server.

5. The receiver of claim 1, wherein the position of the receiver is estimated by the receiver further using pointing directions of the beam cones and the coordinates of the one transmitter.

6. The receiver of claim 5, wherein each beam cone transmits system information comprising the pointing direction of the beam cone and the coordinates of the one transmitter, or the receiver is configured to access a database comprising the pointing direction of the beam cones and the coordinates of the one transmitter.

7. The receiver of claim 1, comprising a plurality of receive antennas, wherein the receiver is configured to further estimate an angle of arrival of each PRS sequence in a global coordinate system.

8. The receiver of claim 7, configured to calculate a position of the receiver using the estimated time of arrival, the pointing direction of the beam cones and the angles of arrival.

9. The receiver of claim 8, comprising a gyroscope, the receiver configured to calculate the orientation of the receiver further using data from the gyroscope.

10. The receiver of claim 1, configured to measure a received signal power, or any other measure of reliability of each beam cone, and to
determine a line-of-sight propagation or a non-line-of-sight propagation of a PRS sequence using the received signal power, or
transmit the received signal power, or any other measure of reliability of each beam cone to the one transmitter for determining a line-of-sight propagation or a non-line-of-sight propagation of a PRS sequence using the received signal power.

11. A wireless communication network, comprising:
a receiver as claimed claim 1; and
a transmitter,
wherein the transmitter is configured to transmit a radio signal, the radio signal comprising a plurality of position reference signal sequences, wherein each PRS sequence has associated therewith a different PRS sequence identifier;
wherein the transmitter is configured to send each PRS sequence using a different beam cone; and
wherein the transmitter is configured to direct the beam cones for sending the plurality of PRS sequences to a spatial region of interest of a wireless communication network.

12. The wireless communication network of claim 11, wherein each PRS sequence has associated therewith a cell identifier, the cell identifier identifying a cell of the wireless communication network which is served by the transmitter.

13. The wireless communication network of claim 11, wherein each beam cone further transmits system information comprising a pointing direction of the beam cone and the coordinates of the transmitter.

14. The wireless communication network of claim 11,
wherein the transmitter is configured to receive from a receiver in the spatial region of interest an estimate of a time of arrival of one or more PRS sequences and the associated PRS sequence identifiers; and
wherein the transmitter is configured to estimate a position of the receiver using the times of arrival and the PRS sequence identifiers.

15. The wireless communication network of claim 11, comprising a plurality of antennas, the transmitter is configured to perform beamforming on each of the PRS sequences to form the PRS sequences for the different beam cones.

16. The wireless communication network of claim 15, wherein the plurality of antennas is formed by an antenna array comprising a plurality of antenna elements, wherein the transmitter is configured to form the different beam cones using a set of precoding matrices, each precoding matrix causing a control of the antenna array to form one of the beam cones directed to the spatial region of interest of the wireless communication network.

17. The wireless communication network of claim 11,
wherein the transmitter is configured to estimate an angle of arrival of signals from a receiver in an uplink transmission, and to identify a signal direction of a received signal having a signal power at or above predefined threshold; and
wherein the transmitter is configured to steer the beam cones according to the identified signal direction.

18. The wireless communication network of claim 11, comprising a location server wherein a position of the receiver is estimated by the location server.

19. The wireless communication network of claim 11, wherein the transmitter is configured to adjust the beamforming weights of the beam cones dependent on an estimated position of the receiver, and wherein the receiver is configured to report updated TOA estimates and PRS sequence identifiers for calculating a position of the receiver.

20. The wireless communication network of claim 11, wherein the receiver comprises a plurality of receive antennas, wherein the receiver is configured to further estimate an angle of arrival of each PRS sequence in a global coordinate system, and wherein the receiver is configured to calculate a position of the receiver using the estimated time of arrival, the pointing direction of the beam cones and the angles of arrival, or to transmit the estimated time of arrival, the pointing direction of the beam cones and the angles of arrival to the location server.

21. The wireless communication network of claim 11, wherein the receiver is a mobile terminal, wherein the transmitter is a base station, and wherein the wireless communication network uses an Inverse Fast Fourier Transform, IFFT, based signal.

22. The wireless communication network of claim 21, wherein the IFFT based signal comprises OFDM with CP, DFT-s-OFDM with CP, IFFT-based waveforms without CP, f-OFDM, FBMC or UFMC.

23. The wireless communication network of claim 22, wherein OFDM with CP is used for a downlink transmission, and DFT-s-OFDM with CP or a single tone transmission is used for an uplink transmission.

24. A method, comprising:
  receiving, at a receiver located in a spatial region of interest served by a transmitter of a wireless communication network, a radio signal from the one transmitter of the wireless communication network, the radio signal comprising a plurality of position reference signal sequences, each PRS sequence having associated therewith a different PRS sequence identifier, each PRS sequence send using a different beam cone of the one transmitter, and the beam cones of the one transmitter for sending the plurality of PRS sequences directed to the spatial region of interest;
  estimating a time of arrival of each PRS sequence received form the transmitter using the different beam cones;
  acquiring for each PRS sequence the associated PRS sequence identifier and an angle of departure at the one transmitter of a beam cone being associated with the PRS sequence identifier; and
  estimating a position of the receiver using the times of arrival of the PRS sequences from the one transmitter the receiver and the acquired angles of departure of the beam cones at the one transmitter;
  wherein the different beam cones are received at the receiver via non-line-of-sight, NLoS, paths.

25. The method of claim 24, further comprising:
  transmitting, by the one transmitter of the wireless communication network, the radio signal, the radio signal comprising the plurality of position reference signal sequences, wherein each PRS sequence has associated therewith a different PRS sequence identifier;
  wherein transmitting the radio signal comprises sending each PRS sequence using a different beam cone, and directing the beam cones to the spatial region of interest of the wireless communication network.

26. A non-transitory digital storage medium having a computer program stored thereon to perform the method of claim 24 when said computer program is run by a computer.

* * * * *